United States Patent [19]

Papuchon et al.

[11] Patent Number: 5,835,258
[45] Date of Patent: Nov. 10, 1998

[54] DEVICE FOR AMPLIFICATION OF AMPLITUDE MODULATION RATIO OF AN OPTICAL BEAM

[75] Inventors: Michel Papuchon, Villebon Palaiseau; Nakita Vodjdani, Orsay; Dominique Delacourt, Clamart, all of France

[73] Assignee: Thomson-CSF, Paris, France

[21] Appl. No.: 549,813

[22] PCT Filed: Mar. 28, 1995

[86] PCT No.: PCT/FR95/00386

§ 371 Date: Dec. 7, 1995

§ 102(e) Date: Dec. 7, 1995

[87] PCT Pub. No.: WO95/27921

PCT Pub. Date: Oct. 19, 1995

[30] Foreign Application Priority Data

Apr. 8, 1994 [FR] France ................................. 94 04167

[51] Int. Cl.[6] .............................. G02F 1/21; G02B 6/10
[52] U.S. Cl. ........................................ 359/333; 385/213
[58] Field of Search ............................... 385/213; 359/333

[56] References Cited

U.S. PATENT DOCUMENTS

| 5,074,631 | 12/1991 | Hamano et al. | 385/3 |
| 5,144,468 | 9/1992 | Weverka | 359/173 |
| 5,206,674 | 4/1993 | Puech et al. | 359/48 |
| 5,243,617 | 9/1993 | Pocholle et al. | 372/6 |
| 5,289,309 | 2/1994 | Delacourt et al. | 359/248 |
| 5,416,858 | 5/1995 | Riviere | 385/2 |

*Primary Examiner*—Nelson Moskowitz
*Attorney, Agent, or Firm*—Oblon, Spivak, McClelland, Maier, & Neustadt, P.C.

[57] ABSTRACT

The invention relates to a modulation ratio amplification device, particularly for amplification at UHF. This device comprises means for making two optical waves, which are of the same amplitude but offset in frequency, interfere. These means may be a frequency converter, coupled to a continuous phase shifter; they may also involve two phase shifters: one continuous, the other varying sinusoidally over time. This type of device makes it possible greatly to amplify the desired modulation ratio, using an optical amplifier, given that the continuous background of the optical signal is suppressed.

5 Claims, 3 Drawing Sheets

DEVICE FOR AMPLIFICATION OF AMPLITUDE MODULATION RATIO OF AN OPTICAL BEAM

The field of the invention is that of optical systems requiring amplitude modulation, particularly at UHF rates.

Currently, one of the problems often encountered is that of the ratio between the electrical power PE, used to perform amplitude modulation, and the electrical power PS supplied by a photodetector capable of detecting the modulated optical wave. This aspect is particularly important in the UHF field, and, moreover, in this case, the modulation signal is of the analogue type which leads to modulation being performed with a modulation ratio less than 1, in order to preserve the quality of the signal. The power generated by the photodetector is then relatively low.

Conventionally, an optical amplifier can be employed before detection by a photodetector, in order to augment the optical signal. It is also possible to use a high-power laser source and an external modulator.

These techniques make it possible to augment the useful optical signal without to that end augmenting the UHF power necessary to generate it.

However, the optical amplifier and the photodetector run a high risk of saturating, by receiving not only the modulated optical power but also the continuous background resulting from a modulation ratio less than 1. The optical power is not used optimally, since it is present not only on the important signal (modulated signal) but also on a continuous background which is of no use to the application.

In order to resolve this problem of limitation of modulation ratio due to the presence of a continuous background, the present invention proposes a device for amplification of amplitude modulation ratio of an optical beam capable of eliminating the continuous background present in a modulated signal. To that end, the device according to the invention comprises means making it possible to make two optical waves, which are of the same amplitude with offset frequencies, interfere, and thereby to obtain a purely sinusoidal optical wave without continuous background.

More precisely, the subject of the present invention is a device for amplification of modulation ratio of a single-frequency incident optical wave, of frequency FL, comprising an optical amplifier AO, characterized in that it comprises, between the incident wave and the amplifier:

an interferometric device with two arms $B_1$ and $B_2$, each arm receiving a part of the incident wave, one of the arms also being fed by an electrical device capable of creating a UHF wave at the frequency FM within the said arm, this interferometric device comprising means for generating, at the output of the two arms, two optical waves of the same amplitude, offset in frequency.

The modulation ratio amplification device, may advantageously comprise, in one of the arms, a frequency converter Tf, controlled by a UHF wave at the frequency FM, and supplying, as output, an optical wave at the frequency FL and an optical wave at the frequency FM+FL, respectively of amplitude $a_1(FL)$ and $a'_1(FM+FL)$, the other arm comprising a continuous phase shifter $D_\phi$, giving rise, as output, to an optical wave at the frequency FL of amplitude $a_2(FL)$ such that, recombined at the output of the interferometric device, with the optical wave of amplitude $a_1(FL)$, an optical wave of amplitude $a'_1(FL)$ results therefrom.

The modulation ratio amplification device according to the invention may also comprise a Mach Zehnder-type interferometer, each of the arms including a phase shifter, one phase shifter being continuous and creating a phase shift of π, the other phase shifter creating a sinusoidal phase shift at UHF. At the output of the interferometric device, there is mainly interference between two optical waves of the same amplitude at frequencies respectively of FL−FM and FL+FM.

A further subject of the invention is a modulation ratio amplification device in which the interferometric device is a Sagnac microinterferometer into which a UHF phase shifter is introduced. The UHF phase shifter may be fed with $UHF_{2\phi FM}$. Two optical waves are also made to interfere, at the output of this interferometric device, these waves being of the same amplitude and being offset by a frequency 2 FM, if the phase shifter is fed at the frequency FM.

The invention will be better understood and other advantages will emerge on reading the description which will follow, given in a non-limiting way, and by virtue of the attached figures among which:

In a general way, the device according to the invention has to cause interference between two waves which are offset in frequency at UHF, of the same amplitude, in order to supply a UHF modulated optical signal exhibiting no continuous background, this signal then advantageously being capable of being amplified optically then detected by a photodetector.

Figure 1:
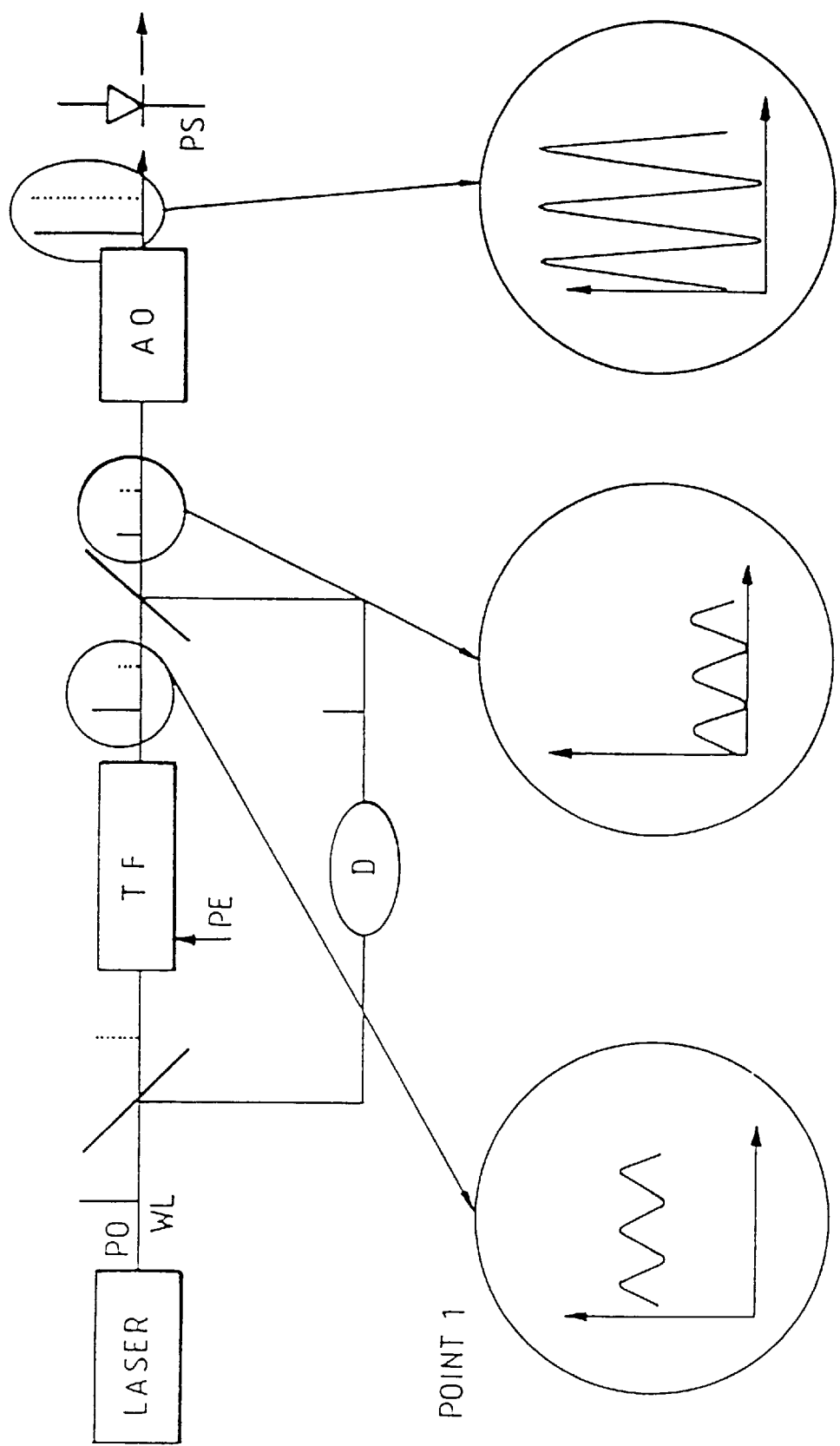
FIG. 1 illustrates an example of a device according to the invention, using a frequency converter Tf.

Hence a first configuration uses an interferometric device comprising, on the one hand, a frequency converter, and on the other hand a phase shifter; the general principle of such a configuration will be better understood by perusing the general diagram of FIG. 1. A laser source, emitting continuously and assumed to be single-frequency and transmitting an optical power PO, is coupled in an interferometric device with two arms. In a first arm $B_1$, a frequency converter Tf is used, fed with UHF power PE. This frequency converter, from an incident optical wave at the frequency FL, generates a wave at the frequency FL+FM and a wave at the frequency FL (FM being the frequency of the UHF wave originating from a generator delivering the power PE).

The ratio between the converted wave of frequency FL+FM and the non-converted wave FL depends on the amplitude of the UHF signal applied. Given that it is sought to reduce the power PE, this ratio is necessarily low. For this reason, in the second arm $B_2$, a phase shifter $D_\phi$ is available, operating continuously, the value of which is adjusted so that, after recombination of the two arms, the two waves at FL and FL+FM have the same amplitude. The dual-frequency optical signal next passes into an optical amplifier AO, of gain G, before being sent to the photodetector which finally analyses the beating between the two waves of different frequencies, in order to supply a signal at the frequency FM.

In this device, it can be seen that if a photodetector were placed just after the frequency converter (point 1), the signal detected would be composed not only of a component at the frequency FM resulting from the beating of the two optical waves of different frequencies, but also of the continuous background due to the fact that the two waves are not of the same amplitude. The action of the interferometer, using a frequency converter and a phase shifter, is thus to suppress the continuous background and to leave only the beating between two waves of the same amplitude, thus with a contrast of 1.

The optical amplifier AO thus amplifies only the useful optical signal and the photodetector runs no risk of being limited by the continuous background. It is thus possible to take advantage of the whole of the maximum output power of the optical amplifier which can be accepted by the photodetector.

The converter Tf of the arm $B_1$ can advantageously be an acoustooptical device of the acoustooptical deflector type fed with UHF. This acoustooptical deflector may comprise a piezoelectric transducer capable of generating an acoustic wave which, by creating an index-grating structure, will frequency-shift an incident optical wave at the frequency FL, by a difference in frequency of FM.

The converter Tf may also be an electrooptical device. By means of electrodes, an electric field is generated which will initiate propagation of a UHF wave.

This phase shifter $D_{\phi o}$ may typically consist of a guide lying between two electrodes so as to apply a continuous electric field, influencing the optical index and thus the optical path of the incident wave so as to obtain the desired phase shift.

Figure 2:
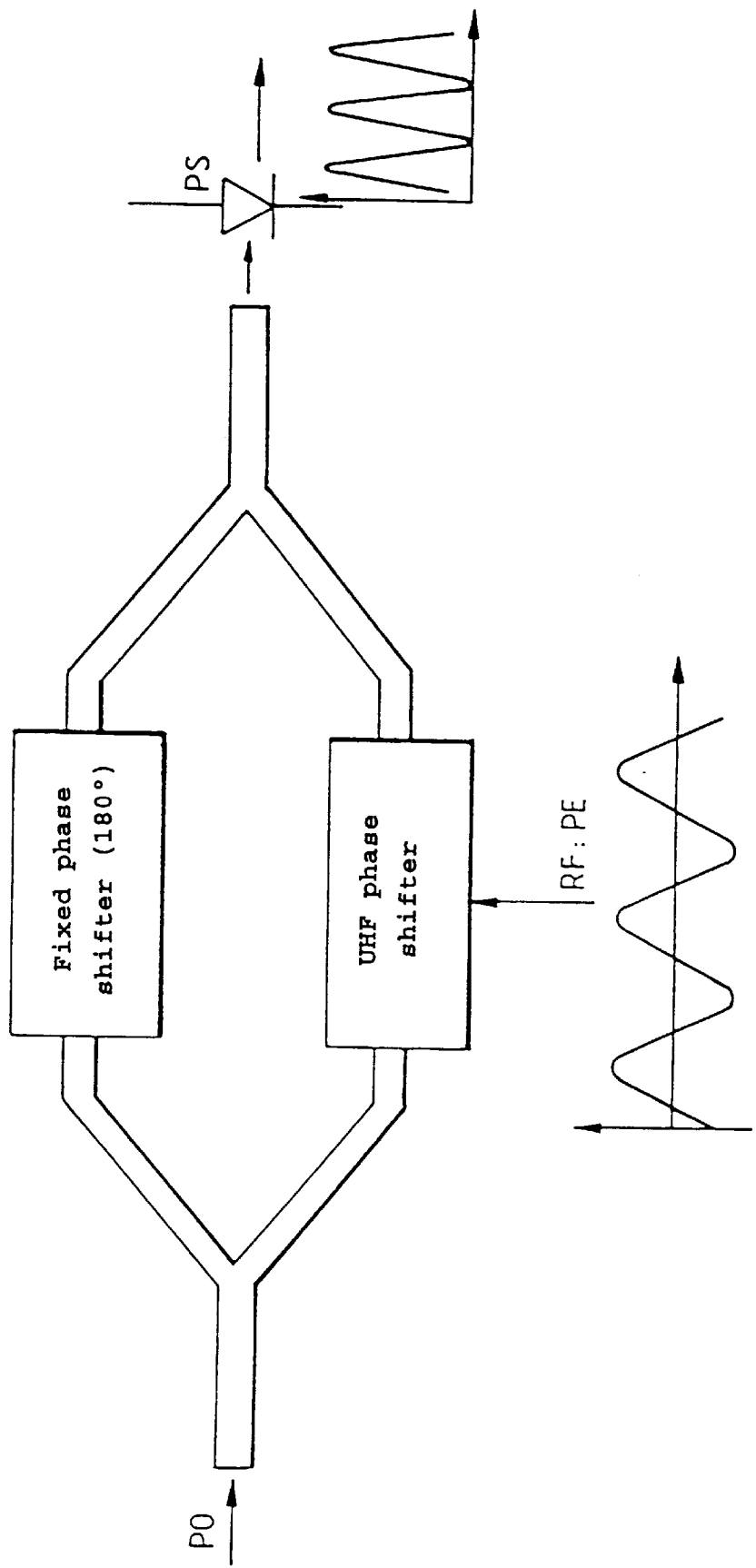
FIG. 2 represents another example of a device according to the invention using an interferometer with two phase shifters, one continuous and one fed with UHF.

In another variant of the invention, the interferometric device may advantageously comprise two phase shifters as illustrated in FIG. 2. In one arm $B_1$, a first phase shifter $D_\pi$ induces a phase shift by a value of $\pi$ on the incident optical wave. In the arm $B_2$, a phase shifter $D_{FM}$ can be inserted, fed electrically at the frequency FM/2. In the arm $B_2$, a series of optical waves is then generated at frequencies FL±FM/2; FL±3 FM/2, etc. with, principally, two predominant components FL+FM/2 and FL−FM/2. At the output of the interferometric device, interference is obtained principally between UHF waves at frequencies +FM/2 and −FM/2, and thus actually a dual-frequency optical wave is obtained with equal amplitudes for the two components and without continuous background after beating.

Figure 3:
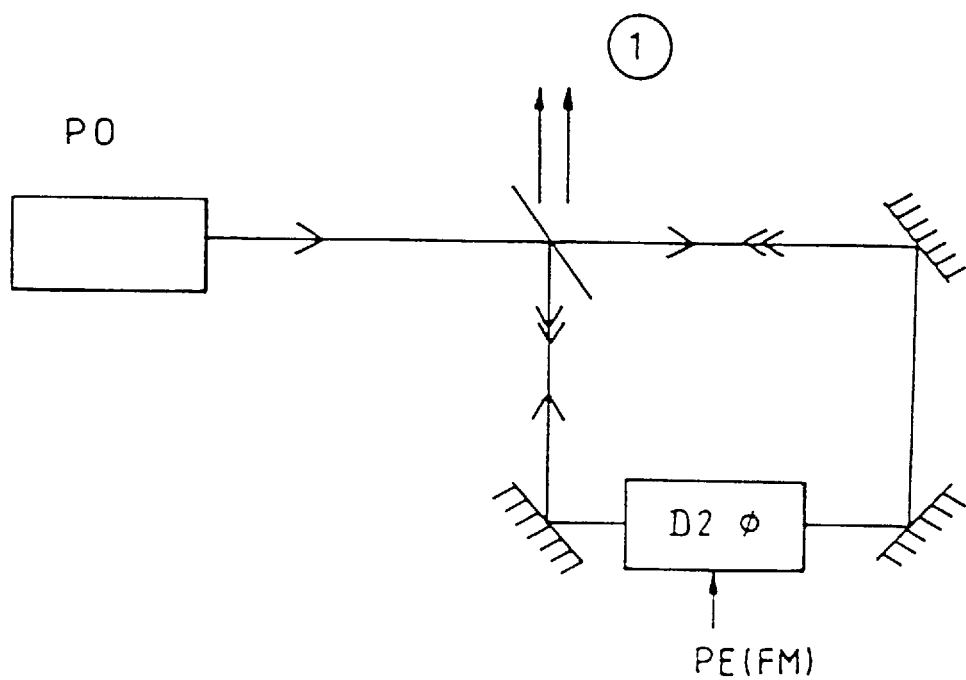
FIG. 3 illustrates a third example of a device according to the invention comprising a Sagnac microinterferometer.

A third interferometric device configuration, used in the device according to the invention, is a Sagnac microinterferometer such as represented in FIG. 3. From a single-frequency laser source, it is possible to produce this type of interferometer with a separating plate and semi-reflecting mirrors. The optical wave at the frequency FL is divided by a separating plate into two waves which propagate in opposite directions along a closed path defined by mirrors. These two counter-propagating waves recombine and produce interference fringes which are capable of being detected by a photodetector placed at point 1. When no non-reciprocal effect is introduced into the closed path, the two counter-propagating waves arrive in phase opposition at point 1. By introducing a phase shifter $D_{2\phi FM}$, varying sinusoidally over time, into the closed circuit, it is possible to create a differential phase shift between the two counter-propagating waves and thus to produce amplitude modulation from a zero level. In such an interferometric device, the operation is thus equivalent to that of a Mach Zehnder interferometer polarized at 180°, but without having to apply a voltage in order to create this phase shift of $\pi$. Thus, for a rate of phase shift of FM/2, a beat signal at the frequency FM is mainly obtained.

We claim:

1. A device for amplification of modulation ratio of a single-frequency incident optical wave, of frequency FL, incurring a continuous background component upon frequency conversion, said device comprising:

an optical amplifier AO for receiving an output of an interferometric device with two arms $B_1$ and $B_2$, each arm receiving a part of the incident wave;

wherein:

said arm $B_1$ includes a frequency converter Tf, controlled by a UHF wave at a frequency FM, outputting an optical wave at the frequency FL and an optical wave at a frequency FM+FL, respectively of amplitude $a_1(FL)$ and $a'_1(FM+FL)$;

said frequency converter is an acoustooptical device;

said arm $B_2$ includes a continuous phase shifter $D_\phi$, outputting an optical wave at the frequency FL of amplitude $a_2(FL)$ such that, recombined at an output of the interferometric device with the optical wave of amplitude $a_1(FL)$. an optical wave of amplitude $a'_1(FL)$ with said continuous background component removed results therefrom.

2. The modulation ratio amplification device according to claim 1, wherein the frequency converter is an acoustooptical deflector.

3. The modulation ratio amplification device according to claim 1, wherein the arm $B_1$ comprises, a fixed phase shifter by $\pi$: $D\pi$, the arm $B_2$ comprising a phase shifter fed with UHF $D_{1\phi FM}$.

4. The modulation ratio amplification device, according to claim 1, wherein the interferometric device is a Sagnac microinterferometer comprising a phase shifter fed with UHF $D_{2\phi FM}$.

5. A device for amplification of modulation ratio of a single-frequency incident optical wave, of frequency FL, incurring a continuous background component upon frequency conversion, said device comprising:

an optical amplifier AO for receiving an output of an interferometric device with two arms $B_1$ and $B_2$, each arm receiving a part of the incident wherein:

said arm $B_1$ includes a frequency converter Tf, controlled by a UHF wave at a frequency FM, outputting an optical wave at the frequency FL and an optical wave at a frequency FM+FL, respectively of amplitude $a_1(FL)$ and $a'_1(FM+FL)$;

said frequency converter is an electrooptical device;

said arm $B_2$ includes a continuous phase shifter $D_o$, outputting an optical wave at the frequency FL of amplitude $a_2(FL)$ such that, recombined at an output of the interferometric device with the optical wave of amplitude $a_1(FL)$, an optical wave of amplitude $a'_1(FL)$ with said continuous background component removed results therefrom.

* * * * *